April 4, 1939. G. MATHES 2,153,383

ELECTROMAGNETIC RAIL BRAKE

Filed July 20, 1938

Inventor:
Gunther Mathes,
by Harry E. Dunham
His Attorney.

Patented Apr. 4, 1939

2,153,383

UNITED STATES PATENT OFFICE 2,153,383

ELECTROMAGNETIC RAIL BRAKE

Günther Mathes, Berlin-Siemensstadt, Germany, assignor to General Electric Company, a corporation of New York Application July 20, 1938, Serial No. 220,361
In Germany August 18, 1937

5 Claims. (Cl. 188—165)

My invention relates to electromagnetic rail brakes, and the object of my invention is to provide an improved electromagnetic rail brake of the type having parallel brake shoes extending lengthwise of the rail. Hereto brakes of this type have consisted of a two-legged core whose adjacent sides extended lengthwise of the rail. In these prior brakes the magnetizing winding was only partially surrounded by magnetic material so that the magnetic losses were large. In accordance with my invention, I reduce these magnetic losses by providing the magnet with a three-legged core and a magnetizing winding around the middle leg, and having a brake shoe secured to each of the three legs.

By this improved construction a considerably greater increase in the attractive force and an appreciable reduction in weight of the brake can be obtained. Also with three parallel brake shoes extending side by side lengthwise of the rail, there is less inert material than when only two shoes are provided. Since the magnetizing winding in my improved brake is on the middle leg, it is substantially enclosed by the two outer legs, the yoke and the brake shoes so that a special protective case is unnecessary. The various parts of the core are also removably secured to each other in such a manner as to provide easy access to the magnetizing winding and also to the brake shoes.

Figure 1:
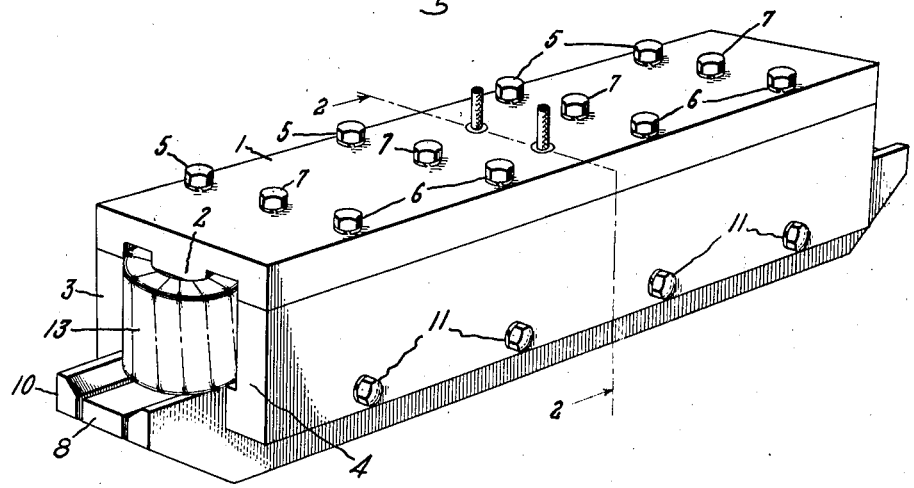
Figure 2:
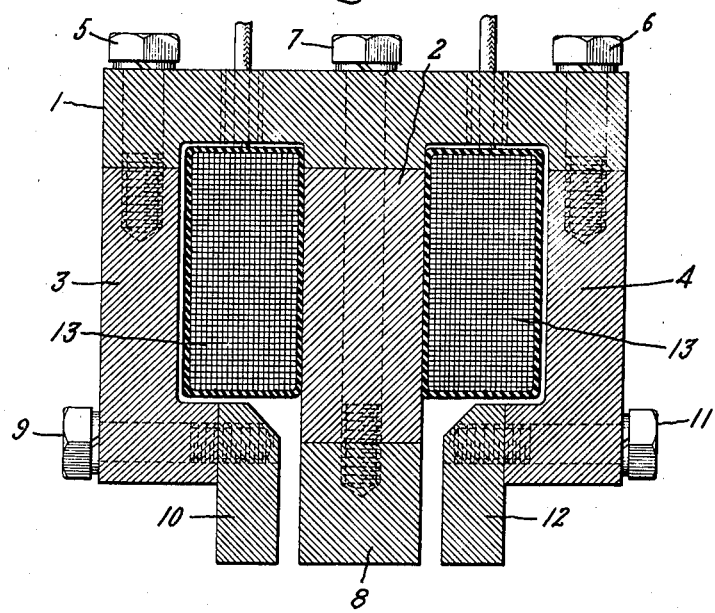

My invention will be better understood from the following description when taken in connection with the accompanying drawing, and its scope will be pointed out in the appended claims. Referring to the accompanying drawing, Fig. 1 of which is a side view of my improved brake magnet and Fig. 2 is a cross-sectional view of the magnet on the line 2—2 of Fig. 1 in the direction of the arrows, the electromagnetic track brake comprises a three-legged magnetic core having a flat yoke 1, extending lengthwise of the rail, and three separate legs 2, 3 and 4, extending downward from the yoke towards the rail and arranged so that their adjacent sides extend lengthwise of the rail. The outer leg 3 is removably secured to the yoke 1 by a plurality of stud bolts 5 which extend through holes in the yoke 1 into threaded holes in the top of the leg 3. The outer leg 4 is similarly secured to the yoke 1 by a plurality of stud bolts 6. The middle leg 2 is removably secured to the yoke 1 by a plurality of stud bolts 7, which extend through holes in the yoke 1 and middle leg 2 into threaded holes in the top of a brake shoe 8, the bottom of which is adapted to engage the top of the rail. The bottom portion of the outer leg 3 projects towards the middle leg 2 and removably secured against the inner surface of this projection, by the stud bolts 9, is a brake shoe 10 the bottom of which is adapted to engage the top of the rail and which is separated from the middle brake shoe 8 by a small gap. Similarly the bottom portion of the outer leg 4 projects towards the middle leg 2 and removably secured against the inner surface of this projection, by the stud bolts 11, is a brake shoe 12 the bottom of which is adapted to engage the top of the rail and which is separated from the middle brake shoe by a small gap.

Around the middle core 2, within the space surrounded by the yoke 1 and the outer legs 3 and 4 so that it is protected thereby, is a magnetizing winding 13. The winding 13 may be wound either directly on the middle leg 2 or wound separately and then slipped over the end of the leg 2.

With the construction shown in the drawing, the middle leg 1 of the core, the winding 13, and the brake shoe 8 may be readily removed by merely taking out the bolts 7 and moving lengthwise the detached middle leg 2, the winding 13 and brake shoe 8. By taking out the bolts 5 and 6 the outer legs 3 and 4, with their attached brake shoes, may be readily detached or, if it is desired merely to detach the brake shoes 10 and 12, this can be readily done by merely removing the bolts 9 and 10. Therefore, it will be seen that not only have I provided a brake magnet having low magnetic losses but also a magnet whose parts are readily accessible.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An electromagnetic rail brake comprising a magnetic core having three legs with their adjacent sides extending lengthwise of the rail, brake shoes respectively secured to said legs and adapted to engage the top of the rail, and a magnetizing winding around the center leg of said core.

2. An electromagnetic rail brake comprising a magnetic core with three legs rigidly secured to a common yoke, said legs having their adjacent sides extending lengthwise of the rail, a separate brake shoe removably secured to each of said legs, and a magnetizing winding around the center leg of said core.

3. An electromagnetic rail brake comprising a magnetic core having a yoke, three legs with their adjacent sides extending lengthwise of the rail, and removable means for rigidly securing each leg to said yoke, a separate brake shoe removably secured to each of said legs and adapted to engage the top of the rail, and a magnetizing winding around the center leg of said core.

4. An electromagnetic rail brake comprising a magnetic core having three legs with their adjacent sides extending lengthwise of the rail, brake shoes respectively secured to said legs and adapted to engage the top of the rail, and a magnetizing winding around the center leg of said core said brake shoes and the outer legs of said core forming a protective casing around said winding.

5. An electromagnetic rail brake comprising a magnetic core having a yoke, three legs with their adjacent sides extending lengthwise of the rail, and removable means for rigidly securing each leg to said yoke, a separate brake shoe removably secured to each of said legs and adapted to engage the top of the rail, and a magnetizing winding around the center leg of said core said yoke and outer legs of said core together with said brake shoes forming a protective casing around said winding.

GÜNTHER MATHES.